United States Patent
Strohschneider

[15] 3,681,571
[45] Aug. 1, 1972

[54] SYSTEM FOR IDENTIFYING ARTICLES

[72] Inventor: Walter Strohschneider, Oberrieden, Switzerland

[73] Assignee: Zellweger Ltd., Uster, Switzerland

[22] Filed: April 17, 1970

[21] Appl. No.: 29,395

[30] Foreign Application Priority Data

April 21, 1969 Switzerland .................6030/69

[52] U.S. Cl......235/61.7 R, 235/61.11 E, 340/149 A
[51] Int. Cl........G06k 7/14, H04q 3/54, G06k 15/18
[58] Field of Search..235/61.11 E, 61.11 D, 61.12 R, 235/61.12 N, 61.11 R, 61.9 R, 61.7 B, 61.7 R, 61.9 A; 340/149 A; 250/219 D; 194/4 F

[56] References Cited

UNITED STATES PATENTS

| | | | |
|---|---|---|---|
| 2,919,851 | 1/1960 | Otis | 235/61.9 R |
| 3,418,456 | 12/1968 | Hamish | 235/61.11 E |
| 3,111,576 | 11/1963 | Lipschvtz | 235/61.11 R |
| 3,538,311 | 11/1970 | Weidmann | 235/61.11 D |
| 2,353,002 | 7/1944 | Armbrvster | 235/61.81 |
| 2,746,679 | 5/1956 | Stratton | 235/61.6 R |

OTHER PUBLICATIONS

Allen, L. G. – " Data Comparison Device" – IBM Tech. Disclosure Bulletin, Vol. 2 No. 4, Dec. 1959

Primary Examiner—Maynard R. Wilbur
Assistant Examiner—Robert M. Kilgore
Attorney—Kenyon & Kenyon Reilly Carr & Chapin

[57] ABSTRACT

The articles are each delivered to a reader which emits one signal to an evaluation unit corresponding to the information contained in the information carrier on the article as well as a second signal to a comparator corresponding to either a nominal value or a tolerance range of a measureable property of the article. The article is also measured in a measuring unit which emits a third signal to the comparator corresponding to the measured property. If the measured signal agrees with the nominal value or tolerance range, the information of the first signal is released for processing; if not, the article is recycled.

18 Claims, 1 Drawing Figure

PATENTED AUG 1 1972
3,681,571
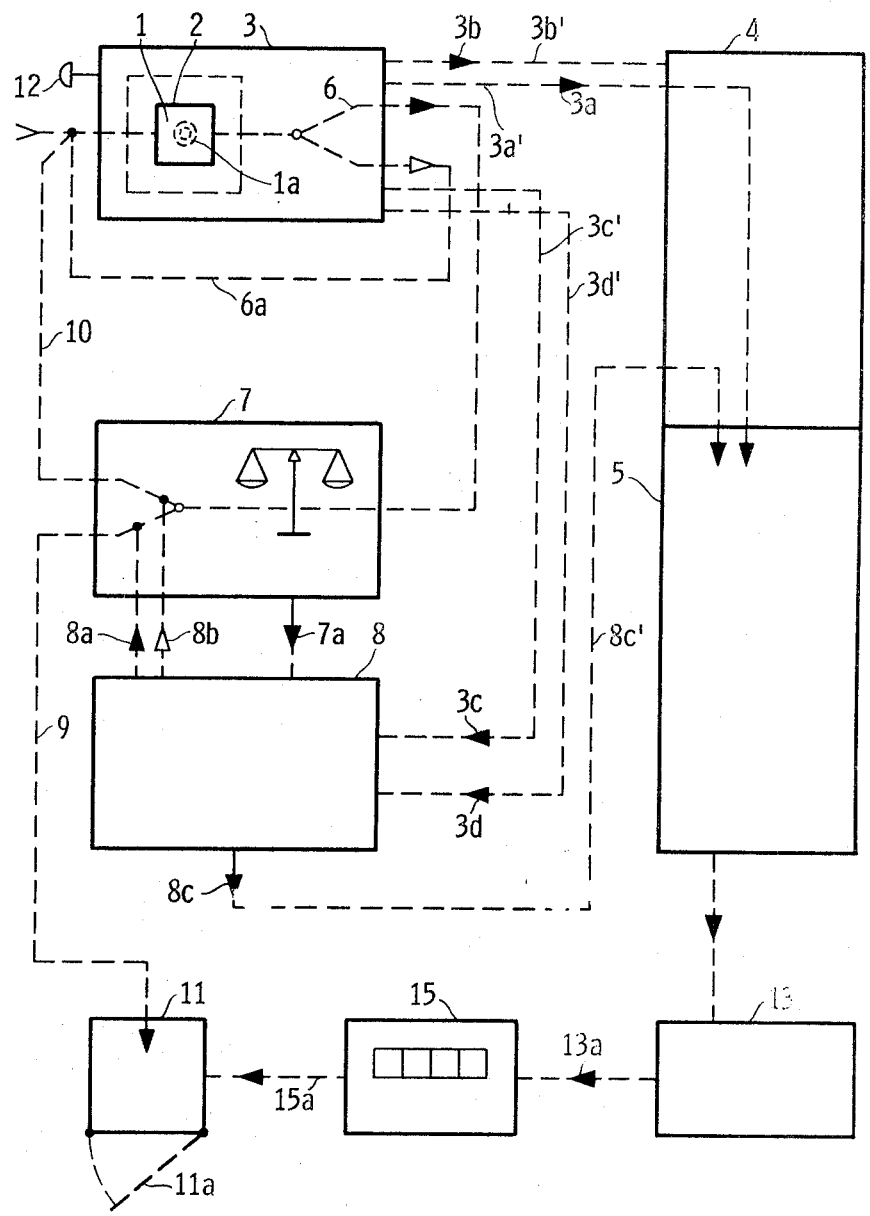
INVENTOR
WALTER STROHSCHNEIDER
BY
Kenyon & Kenyon Reilly Carr & Chapin
ATTORNEYS

SYSTEM FOR IDENTIFYING ARTICLES

This invention relates to a process and apparatus for identifying articles.

Heretofore, it has been of considerable importance in the sale of goods and merchandise, for example, in self-service stores, in the distribution of goods from warehouses and the like, to quickly and reliably identify the articles bought by the customer or distributed from a warehouse. It is on the basis of this identification that cash slips, invoices, credit notes, and similar vouchers which in turn are used for example in accounting and/or stock control are prepared.

In some cases, it has been known to identify articles that have information carriers associated with each item or article to be identified e.g., Swiss Pat. No. 457,926. In other cases, it has been possible to identify articles which have not been specially distinguished for automatic identification through the measurement of physical properties e.g. Swiss Pat. No. 460,400. For example, articles to be identified can be provided with an information carrier in the form of a graphic feature such as a geometric pattern which may be applied to a supporting surface of the article. The feature may be read, for example, from below by means of an electro-optical device as the article passes the reading device. Information typical of the article in question, for example a serial number, is obtained from the reading of the geometric pattern. The price to be paid is, for example, subsequently determined from this characteristic information. However, in this identification system it is readily possible for the article to have another marking placed thereon, either inadvertently or fraudulently which is not picked up by the reader and thus slips past unrecognized so that the price to be paid for the article is not determined.

Thus, these above solutions to the problem of identification have not been altogether satisfactory. Also, these systems have involved considerable outlay and have not been entirely foolproof.

Accordingly, it is an object of the invention to provide for a substantially fraud-proof system of identifying articles such as consumer goods.

It is another object of the invention to provide a reliable economic system of identifying articles.

Briefly, the invention is directed to a system in which each article to be identified carries an information carrier which is typical of the article and hence its serial number, for example, which can be read by a suitable reader as is known. The reading of the information carrier on the article serves to obtain further information typical of the article for the further processing of the article. In addition, a nominal value and/or a tolerance range typical of a measureable property of the article, such as weight, is obtained by the reader from the information carrier. The system also includes a measuring unit in which at least one measureable property of the article is determined. Further, a comparator is used in the system to receive a signal from the reader corresponding to the nominal value and/or tolerance range as well as a signal from the measuring unit corresponding to the measured value. These signals are then compared in the comparator. If the result supplied by the measuring unit corresponds to or falls in the range of the signal then the information derived from the reading of the information carried on the article is released as the identification of the article. If the result does not so correspond, the article is re-cycled.

Another marking can also be placed on the article to be identified to influence the result supplied by the measuring unit, insofar as such leads to a true value, for example, of the total weight which lies outside the predetermined tolerance range. This factor is utilized for rejecting the articles in question.

The data for the particular nominal value associated or for the particular tolerance range associated with each of the articles which can be delivered to the system are thus carried by each article by means of its information carrier, and are read from case to case by the reading unit. Accordingly, there is no need to provide in the apparatus itself a store for all such data., i.e. for all the articles to be identified. In view of the large number of different kinds of articles, for example, 100,000 this represents a considerable economic advantage over solutions in which all such data are stored in a store and periodically removed for each identification.

If the information accommodated in the information carrier, typical of each of the articles to be identified also contains details, for example, on the price to be charged in the form of a serial number, there is also no need for a store for the total storage of all the prices associated with each of the articles to be identified, as this information can be read directly.

The invention provides a method of identifying articles wherein information typical of a given article is obtained by automatically reading an information carrier on that article and this typical information on the article is only released as identification thereof when at least one automatically effected measurement of at least one measureable property of the article supplies a result which corresponds to a nominal value obtained by reading the information carrier or which lies within a tolerance range obtained from the reading of the information carrier.

The invention also provides an apparatus for identifying an article which has an information carrier thereon containing information typical of that article. This apparatus comprises a reader to which the article is delivered and which is capable of reading the information carrier and emitting signals or the like in response to the read information carrier; a measuring unit for measuring a property of the article under scrutiny; and a comparator having an input end which receives a signal corresponding to the measured result of the measuring unit as well as a signal corresponding to either a nominal value or a tolerance range of the result obtained by reading the information carrier on the article. The comparator further has an output end from which an output signal is delivered to an evaluation unit for further processing of the article.

The invention provides a system which can be used for the automatic identification of different kinds of articles and objects of the kind sold, for example, in a self-service store. In one embodiment, information as to the prices of identified items, associated with the individual serial numbers, is fet to a clearing or charging installation on completion of identification, i.e. after the information typical of the articles, for example their serial numbers, has been determined and the weight of the articles under scrutiny successfully checked. The total amount to be paid to the cash desk for all the items purchased by a customer can then be automatically calculated and indicated. It is also possible as an alternative for a cash account belonging to a given customer to be automatically debited with the aforementioned total.

It is also possible to automatically collect turnover statistics, if desired separately for individual articles or groups of articles, with known means from the identification of all the articles delivered by the customer to and passed by the apparatus of the system.

These and other objects and advantages of the invention will become more apparent from the following detailed description and appended claims taken in conjunction with the accompanying drawing in which:

The FIGURE illustrates a block diagram of an identification system according to the invention.

Referring to the drawing, an article 1 to be identified is delivered in sequence as in a row of articles directly or on a conveyor belt (not shown) into a readoff zone 2 of a receiving station of a reader 3. Each article 1 is provided, for example, on at least one of its possible supporting surfaces with an information carrier 1a such as the serial number of the article and/or with an article marking in which the information typical of the article is contained. To this end, various types of markings or codes are known which can be applied to articles or goods. However, it is also possible for the information carrier 1a to be in the form of a graphic feature, for example, a geometric pattern. A feature such as this can be printed on the article 1 itself or on a package containing the article. Since such a feature, i.e. the information carrier 1a, can be applied when the package or article is being printed, relatively small if any costs are involved in providing the articles with the information carrier 1a by this method.

Readers for automatically reading figures such as serial numbers and graphic features are also known and therefore the reader 3 which serves to automatically read off the information carrier 1a need not be further described. For example, readers for this purpose have been described in "Taschenbuch der Nachrichtenveranbeitung", K. Steinbuch 2nd Edition 1967, Springer-Verlag Berlin, Heidelberg, New YOrk (Library of Congress Catalog Card Number 67–21079) pages 754 to 787 ; over fifty being listed in page 783.

In operation, the reader 3 emits an output signal 3a which is derived from the reading of the information carrier 1a on the article 1 and which contains information typical of the article 1. This output signal 3a e.g. an impulse sequence is then transmitted via a suitable connection such as a link 3a' to an evaluation unit 4 e.g., a computer 4 wherein the information (i.e. serial number) of the article is derived from the output signal 3a in known manner. The price of the article or other information can then be determined as is known in the evaluation unit 4 on the basis of the serial number. This price can then be stored in a store 5 of the evaluation unit 4 under the address-serial number-and interrogated by the evaluation unit 4.

The reader 3 also obtains additional information from the reading of the information carrier 1a on the article 1, or from the reading of one or more additional information carriers (not shown) on the article 1. This additional information includes data for marking at least one nominal value and/or tolerance range for a result to be obtained from at least one measurement of at least one measureable property of the article 1. This additional information is transmitted by the reader 3, e.g. in the form of electrical signals 3c, 3d such as impulse sequences for displaying digital values through lines 3c', 3d', to a comparator 8.

After the reading step has been carried out and the various signals obtained, the article 1 is delivered by a conveyor 6, for example, a conveyor belt, to a known type of measuring unit 7. As the article 1 passes through the measuring unit 7, at least one measureable property of the article, for example, its weight, is measured. To this end, the measuring unit may be in the form of an automatic weighing machine which is provided with its own conveyor belt for receiving, conveying and releasing the article on completion of weighing. For example, an automatic balance for weighing the article such as a Garvens Electronic High-Speed Checkweigher, or a Sartorius Electronische Präzisions - and Analysenwaegen, available with a digital readout, or a checkweighing system as described in "Chemical Processing", Lodon, October 1967, page 82, can be used.

Alternative, other properties such as color, dielectric constant, dielectric loss factor and the like can be measured and signals emitted in response thereto. The measuring unit in such cases would thus be adapted to measure such properties. For example, a measuring unit for the automatic dimensional inspection of an object as described in U.S. Pat. No. 3,365,699 issued Jan. 23, 1968 can be used. Such a measuring unit issues a measured result as an analog value which, as is known, can be converted to a digital result by a suitable analog-to-digital converter, e.g. as described in the above mentioned publication in pages 710 to 734 as well as in "Analog-Digital Conversion Handbook " (E—5100 7/64) by Barbera W. Stephenson, Digital Equipment Corp., Maynard, Mass. (1964). Further, a measuring unit for measuring color, such as a Spectromat FS–2, Pretema, can be used.

After a measurement is taken in the measuring unit 7, a result or signal 7a, for example, in the form of an electrical impulse sequence for digitally displaying the actual weight of the article 1 is delivered to the input end of the comparator 8.

The sequence of reading in the reader 3 and measuring in the measuring unit 7 can be alternatively be reversed. Also, the reader 3 can be functionally combined with measuring unit 7 so that simultaneous reading and measurement can be accomplished. Further, when the reading and measuring steps are not carried out simultaneously, it can be of advantage depending on the design of the comparator 8 to temporarily store the information obtained by the reading and/or measuring steps.

The comparator 8 which receives the respective signals 3c', 3d' and 7 a from the reader 3 and measuring unit 7 can be of any known construction such as a comparator for comparing digital values expressed in the so-called BCD code. In operation, the comparator 8 includes suitable means (not shown) to compare the signal 7 from the measuring unit 7 with the signal or signals 3c', 3d' from the reader 3 corresponding to the nominal value or tolerance range for the property measured in the measuring unit 7 to determine whether or not the signal 7a either agrees with the nominal value signal or falls in the tolerance range as expressed by the signals 3c', 3d. In the event of a GOOD result, i.e., when the signal 7a either agrees with the nominal value or falls in the tolerance range, an output signal 8a is emitted to a conveyor 9 from the comparator 8 to actuate the conveyor 9 in a manner so as to take the article from the measuring unit 7 and convey the article 1 to a container 11 at a delivery station. However, in the event of a NOT-GOOD result, i.e. when the signal 17a supplied by the measuring unit 7 does not agree with the nominal value or does not lie in the tolerance range, another output signal 8b is emitted to another conveyor 10 from the comparator 8 to actuate the conveyor 10 in a manner so as to return the article 1 to the input of the reader 3.

Further, at the same time as the comparator 8 shows approval, i.e. a GOOD result, the comparator 8 can also emit another output signal 8c through a connection 8c' to the evaluation unit 4 so as to initiate release of the information taken by the signal 3a from the reader 3 in the evaluation unit 4 as positive identification of the article 1. In this way, the evaluation unit 4 can be made in known manner to call a price associated with the identified article 1 from the store 5 and deliver the price to a charging unit 13 of known construction. For example, all the prices of a series of articles delivered by a customer to the reader 3 can be added in the charging unit 13. After delivering all the articles to the reader 3, the customer depresses a totalizer key 12 on the reader 3. This causes the reader 3 to release a signal 3b' through a line 3b' to the evaluation unit 4 which signal 3b actuates the evaluation unit 4 so as to have the total amount for all the articles of a given customer calculated in the charging unit 13. The total thus calculated can be delivered, for example, as a signal 13a to a cash unit 15 displayed there. After the amount shown has been paid, a release flap 11a in the container 11 can be temporarily opened by a control signal 15a from the cash unit 15 so that the customer can remove the goods purchased from the container 11.

In another advantageous embodiment, the information typical of the article 1 which is contained in the information carrier 1a, can also contain information on the price of the article 1. In this case, there is no need for the aforementioned interrogation of a price stored in the store 5 under the address: serial number. Instead, the price details obtained by reading the information carrier 1a on the article 1 delivered to the reader 3 can be directly delivered from the reader 3 to a charging unit 13. As already mentioned, these prices can be totalled and the total conveyed to the cash unit 15. Accordingly, this particular embodiment of the invention simply requires a reader 3, at least one measuring unit 7 and at least one comparator 8. The computer and the store 5 are not required. In this embodiment also the evaluation unit 4 comprises one or more conveyors 9, 10 and/or a charging unit 13 and/or a cash unit 15 and/or a container release flap 11a controlled by the comparator 8.

It is also advantageous for displaying information in the information carrier 1a of the article 1 and for reading such an information carrier, to apply one of the fault-prevention techniques as is known from the communications industry. Thus, in the event of faulty or unsuccessful reading, the unsuccessfully read article 1 can be returned to the input of the reader 3 optionally by a conveyor 6a controlled by a known type of fault-detecting system of this kind. Alternative, the fault detector system may be used to control a signalling device, for example, in the form of a fluorescent screen, so that the customer can be requested to deliver the article 1 to the reader 3 in a better position, i.e. for example in the position of greater advantage for the purposes of reading.

What is claimed is:

1. A process for identifying each article of an arbitrary selection of different articles, each selection including a plurality of articles comprising the steps of
   automatically reading off at least one feature of each article individually at a readoff zone to collect information associated with each article, said information including at least the price of the article and a tolerance range of a measurable physical property thereof;
   temporarily storing the read information of each article individually as a provisional identification thereof;
   automatically measuring at least one physical measurable property of each article individually to obtain a measured result of each article;
   automatically comparing the measured result of each measured article with the tolerance range corresponding to the provisional identification thereof;
   thereafter individually releasing the provisional identification of each article in response to the measured result falling within the tolerance range therefor;
   automatically conveying each article individually to a container at a delivery station in response to said measured result falling in said tolerance range for subsequent removal; and
   subsequently individually receiving the price of each identified article from the provisional identification thereof and adding the received prices of the identified articles to obtain a total price for the selection of articles.

2. A process as set forth in claim 1 wherein the article to be identified is delivered initially to at least one reader for reading the information carrier thereon and then to at least one measuring unit for measuring at least one measurable property of the article.

3. A process as set forth in claim 1 wherein the measureable property of the article is initially measured and subsequently delivered to at least one reader for reading of the information carrier on the article.

4. A process as claimed in claim 1 wherein the article is delivered to a combination of at least one reader with at least one measuring unit.

5. A process as claimed in claim 1 wherein the reading of the information carrier is effected during at least one measurement of one measureable property.

6. A process as set forth in claim 1 which further comprises the steps of monitoring the automatic reading of the information carrier of the article to detect the orrucance of a faulty reading of the information carrier during said step of reading.

7. A process as set forth in claim 6 which further comprises the step of rejecting the article in response to the occurance of a faulty reading to prevent releasing of the information typical of the article as identification thereof.

8. A process as set forth in claim 6 which further comprises the steps of emitting a signal in response to the occurance of a faulty reading.

9. A process as set forth in claim 1 which further comprises the step of returning the article to the readoff zone in response to said measured value falling outside the tolerance range.

10. An apparatus for automatically verifying the identification of each article of a plurality of articles of an arbitrary selection of different articles, each carrying an information carrier thereon containing information typical of the article and including at least the price thereof comprising at least one reader for sequentially receiving each article of said selection in a readout zone thereof to individually read out the information carrier of each article and emit a first signal characteristic of said information carrier and a second signal corresponding to a selective one of a nominal value of a measureable physical property thereof and a tolerance range of the measureable property;

a measuring unit for individually measuring a measureable physical property of the article to be identified and emitting a third signal corresponding to the measured property;

a comparator connected to said measuring unit to receive said third signal therefrom and to said reader to receive said second signal therefrom, said comparator having means for comparing said second and third signals and emitting an output signal in response to said third signal corresponding to said second signal;

means connected to said reader to temporarily store said first signal and connected to said comparator to receive said output signal and release said first signal from said means in response to reception of said output signal;

a container at a delivery station;

a conveyor between said measuring unit and said container for conveying each article to be identified individually to said container in response to emission of said output signal; and a cash register receiving said first signal from said means to store and to display the price of each article and to total the prices of the articles of the selection.

11. An apparatus as set forth in claim 10 further comprising a conveyor connecting said reader to said measuring unit to convey the article to be identified from said reader to said measuring unit.

12. An apparatus as set forth in claim 10 wherein said reader and said measuring unit are disposed in a functional unit.

13. An apparatus as set forth in claim 10 further comprising a fault detecting means connected to said reader for detecting the occurrance of a faulty reading by said reader of the article to be identified.

14. An apparatus as set forth in claim 13 wherein said fault detecting means includes a conveyor connected to said reader for returning the article to be identified to said reader for a further reading after exiting of the article therefrom.

15. An apparatus as set forth in claim 13 wherein said fault detecting means includes a signalling arrangement for indicating a faulty reading by said reader.

16. An apparatus as set forth in claim 1 further comprising a first conveyor between said measuring unit and said reader for returning the article to be identified to said reader in response to said output signal not occurring, a container at a delivery station, and a second conveyor between said measuring unit and said container for conveying the article to be identified to said container in response to said output signal occurring.

17. In a system for automatically verifying the identification of each article of a plurality of articles of an arbitrary selection of different articles, each article carrying an information carrier thereon containing information typical of the article comprising a reader for sequentially receiving each article in a readout zone thereof to read the information carrier thereon and to emit a first signal corresponding to a first characteristic of the article and a second signal corresponding to either of a nominal value or a tolerance range of a measureable physical property of the article;

a measuring unit for individually measuring a measureable physical property of the article and emitting a third signal corresponding to the measured property;

a comparator connected to said reader to receive said second signal therefrom and to said measuring unit to receive said third signal therefrom for comparison of said third signal with said second signal and for emitting an output signal in response to said third signal being compatible with said second signal;

an evaluation unit including a store having prices stored therein corresponding to the articles of said selection, said store being connected to said reader to receive said first signal therefrom and to call out the price corresponding to said first signal; said store being further connected to said comparator to receive said output signal therefrom for release of said price;

a container at a delivery station;

a conveyor between said measuring unit and said container for conveying each article to be identified individually to said container in response to emission of said output signal; and a charging unit connected to said store to receive the prices of the individual articles identified.

18. In a system as set forth in claim 17 wherein said charging unit receives a sequence of first signals from a series of read articles and totals a corresponding series of prices and which further comprises a cash unit connected to said charging unit for displaying the totaled prices.

* * * * *